United States Patent
Huang et al.

(10) Patent No.: US 11,991,764 B2
(45) Date of Patent: May 21, 2024

(54) MULTI-LINK RE-SETUP AND LINK CHANGE

(71) Applicant: Intel Corporation, Santa Clara, CA (US)

(72) Inventors: Po-Kai Huang, San Jose, CA (US); Laurent Cariou, Portland, OR (US); Daniel Bravo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 365 days.

(21) Appl. No.: 17/077,469

(22) Filed: Oct. 22, 2020

(65) Prior Publication Data

US 2021/0045175 A1    Feb. 11, 2021

Related U.S. Application Data

(60) Provisional application No. 62/924,373, filed on Oct. 22, 2019.

(51) Int. Cl.
| | |
|---|---|
| H04W 4/00 | (2018.01) |
| H04L 5/00 | (2006.01) |
| H04W 76/15 | (2018.01) |
| H04W 76/19 | (2018.01) |
| H04W 80/02 | (2009.01) |

(52) U.S. Cl.
CPC ........... *H04W 76/15* (2018.02); *H04L 5/0055* (2013.01); *H04W 76/19* (2018.02); *H04W 80/02* (2013.01)

(58) Field of Classification Search
CPC .......... H04W 76/15; H04W 76/19; H04L 5/00
See application file for complete search history.

(56) References Cited

U.S. PATENT DOCUMENTS

| | | | | |
|---|---|---|---|---|
| 6,950,862 | B1 * | 9/2005 | Puthiyandyil | H04L 69/24 370/335 |
| 10,164,871 | B2 * | 12/2018 | Parron | H04L 45/245 |
| 11,076,385 | B2 * | 7/2021 | Huang | H04L 1/188 |
| 11,202,286 | B2 * | 12/2021 | Huang | H04W 72/27 |
| 11,632,817 | B2 * | 4/2023 | Kim | H04W 76/15 370/338 |
| 2019/0082373 | A1 * | 3/2019 | Patil | H04L 1/1614 |
| 2019/0150214 | A1 * | 5/2019 | Zhou | H04W 76/15 370/329 |
| 2019/0335454 | A1 * | 10/2019 | Huang | H04W 72/542 |

FOREIGN PATENT DOCUMENTS

EP          3860012 A1 *  8/2021  ........... H04L 5/0053

* cited by examiner

*Primary Examiner* — Elisabeth Benoit Magloire
(74) *Attorney, Agent, or Firm* — Eversheds Sutherland (US) LLP

(57) ABSTRACT

This disclosure describes systems, methods, and devices related to an extreme high throughput (EHT) signaling structure. A device may establish a communication channel with one or more station devices (STAs). The device may generate an extreme high throughput signal field (EHT-SIG) of a header, wherein the EHT-SIG field comprises information associated with resource allocations (RUs). The device may generate a frame comprising the header. The device may assign a first RU to a first station device. The device may assign a second RU to the first station device, wherein the first RU or the second RU is an aggregation of a 26-tome RU and a neighboring RU. The device may cause to send the frame to the first station device.

18 Claims, 11 Drawing Sheets

MULTI-LINK RE-SETUP AND LINK CHANGE

CROSS-REFERENCE TO RELATED APPLICATION(S)

This application claims the benefit of U.S. Provisional Application No. 62/924,373, filed Oct. 22, 2019, the disclosure of which is incorporated herein by reference as if set forth in full.

TECHNICAL FIELD

This disclosure generally relates to systems and methods for wireless communications and, more particularly, to multi-link re-setup and link change.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

Figure 1:
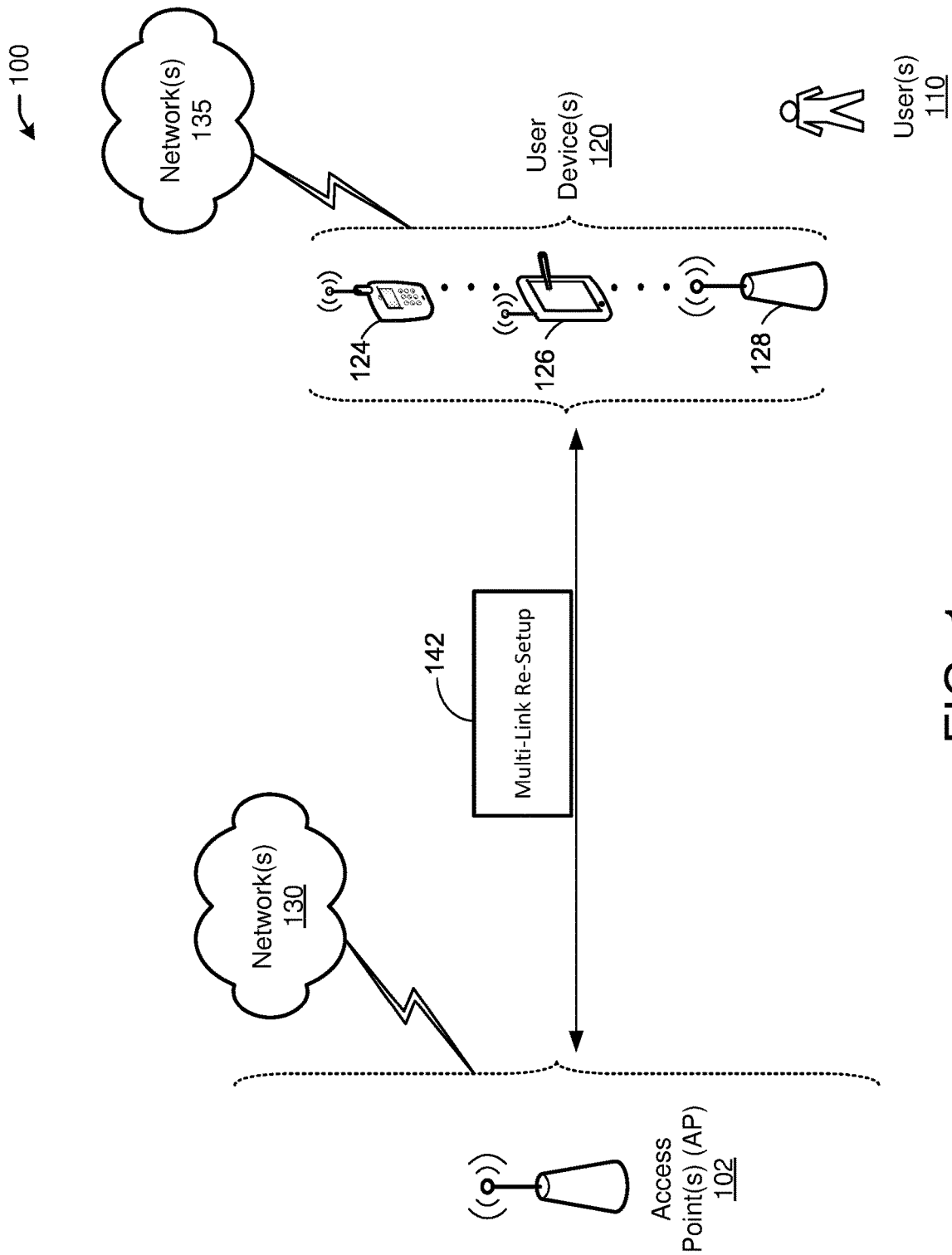
FIG. 1 is a network diagram illustrating an example network environment for multi-link re-setup, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

Existing wireless device communication, referred to herein as legacy operation, may include a singular link operation (i.e., a one-link operation) between an access point (AP) and a non-AP, where association request/response is used for the single link setup between the AP, such as a router operating in a home network, and the non-AP, such as a device such as a tablet computer or mobile device. With conventional wireless device systems, when connecting to an upper layer distributed system medium (DSM) (e.g., the Internet), the router or other upper layer AP device may see any connected non-AP device as a single address point. When the DSM is connecting to the lower layer device, the upper layer also views the lower layer device as a singular object and passes the data through that single AP. Legacy systems may set up this singular link during the association phase of the connection.

Existing one-link operation also has the functionality of reassociation, where the mapping of routing through the DSM to the non-AP is changed to another AP or the current setting, where the existing AP is reset. Existing one-link operation may also include disassociation, where the existing mapping to DSM is deleted. However, existing one-link operation does not provide for simultaneous multiple links through a singular AP, such that the upper layer may connect to the lower layer through the singular access point. Conventional one-link systems do not have ability to connect to multiple connections simultaneously to a lower layer device.

Example embodiments of the present disclosure relate to systems, methods, and devices for multi-link operation through a multi-level device (MLD).

In one example embodiment, the MLD may connect the DSM to pass the data through a specific point that appears as a singular object from the perspective of the DSM. Scheduling is local to the AP router (e.g., the AP-MLD), where traffic is sent to the AP-MLD between the non-AP MLD and the AP MLD. The MLDs perform scheduling decisions based on local hardware conditions and capabilities that links can be setup by a two-way handshake called multi-link association request/response among two MLDs.

Compared with a single link setup that we have today, after association request/response exchange between an AP and a non-AP STA, embodiments described herein include a mapping for the MAC data service interface of AP as the entry point for routing to non-AP through DSM. One reason for creating the MLD includes connection of the upper layer to pass the data through a specific point that appears as a singular object from the perspective of the upper layer. Scheduling is local to the AP router, where traffic is sent to the local AP router between the non-AP MLD and the AP MLD. The AP-MLD can perform the scheduling decisions based on local hardware conditions and capabilities.

According to an embodiment of the present disclosure, a multi-link re-setup mechanism includes a different AP MLD that a non-AP MLD changes the entry point mapping through DSM from the MAC data service interface of AP MLD 1 to the MAC data service interface of AP MLD 2.

According to another embodiment of the present disclosure, a MLD may remove the entry point mapping through DSM under multi-link (similar to the functionality of disassociation). There are at least two purposes for reassociation. One purpose includes crating an AP, and another purpose includes changing the association of the link. Changing the association may include renegotiating the link associations by changing or removing some or all of the set up links.

Removing the entry point mapping may further include disassociation. Disassociation may remove the AP, and remove all of the links set up. In another aspect the disassociation may remove one or more of the links but keep the existing AP. For example, the non-AP device may want to preserve the AP, but change the parameters. In another aspect, the non-AP device may reassociate from one AP MLD to another AP MLD. In yet another aspect, the non-AP device may also change the parameters by changing from a single link to two links, or three links, etc.

Embodiments of the present disclosure further include a mechanism to change the entry point mapping through DSM to another AP MLD's MAC data service interface (similar to the functionality of reassociation to a different AP different from the current associated AP).

As explained above, disassociation may remove the existing link, and may also remove the AP. This may include renegotiating the link associations by removing some or all of the set up links. The AP MLD may further remove one basic service set (BSS) by sending group addressed disassociation.

Another embodiment of the present disclosure includes a mechanism that maintains the entry point mapping through DSM, and deletes all the data transmission negotiation, security negotiation, and reset parameters.

In another embodiment of the present disclosure, a mechanism removes one or more links under the same entry point mapping through DSM.

In yet another embodiment of the present disclosure, a mechanism adds one or more links under the same entry point mapping through the DSM. For example, the AP MLD restarts one BSS.

Example embodiments of the present disclosure relate to systems, methods, and devices for multi-link re-setup and link changes. In one or more embodiments, a multi-link re-setup device (MLD) may include processing circuitry coupled to storage, configured to:

1) Establish multiple links between the AP MLD and a non-AP MLD via a single request frame from the non-AP MLD and single response frame from the AP MLD;

2) Change an entry point mapping to the non-AP MLD to a distributed system medium (DSM) from another AP MLD to the AP MLD or reestablish multiple links between the AP MLD and a non-AP MLD via a single request frame response frame exchange; and 3) Keep the entry point mapping to the non-AP MLD to a distributed system medium (DSM) as the AP MLD.mapping to two or more simultaneous links from the AP MLD to the non-AP MLD.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

It is understood that the above descriptions are for purposes of illustration and are not meant to be limiting.

FIG. 1 is a network diagram illustrating an example network environment of multi-link re-setup, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 6:
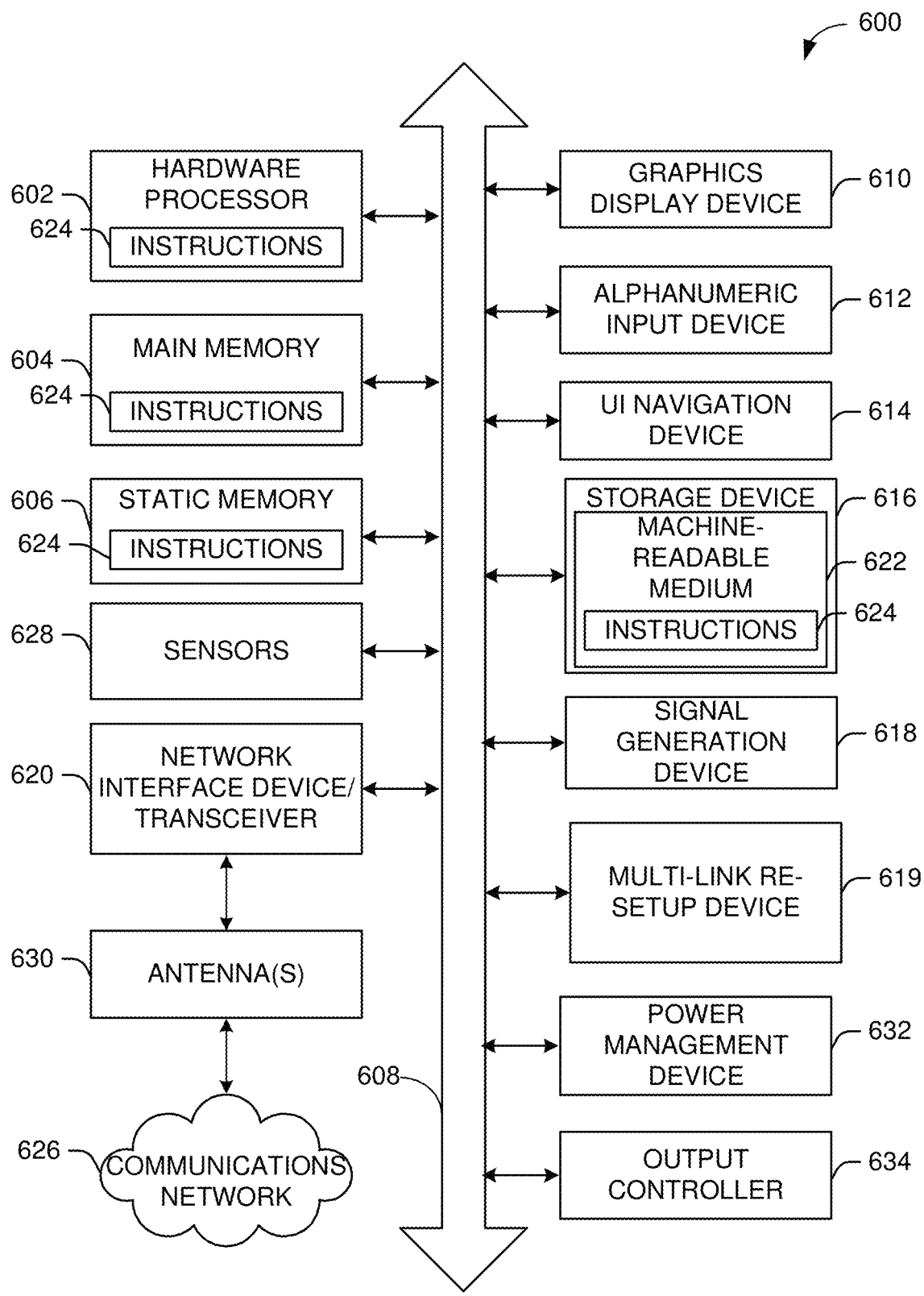
FIG. 6 illustrates a functional diagram of an exemplary communication station that may be suitable for use as a user device, in accordance with one or more example embodiments of the present disclosure.
Figure 7:
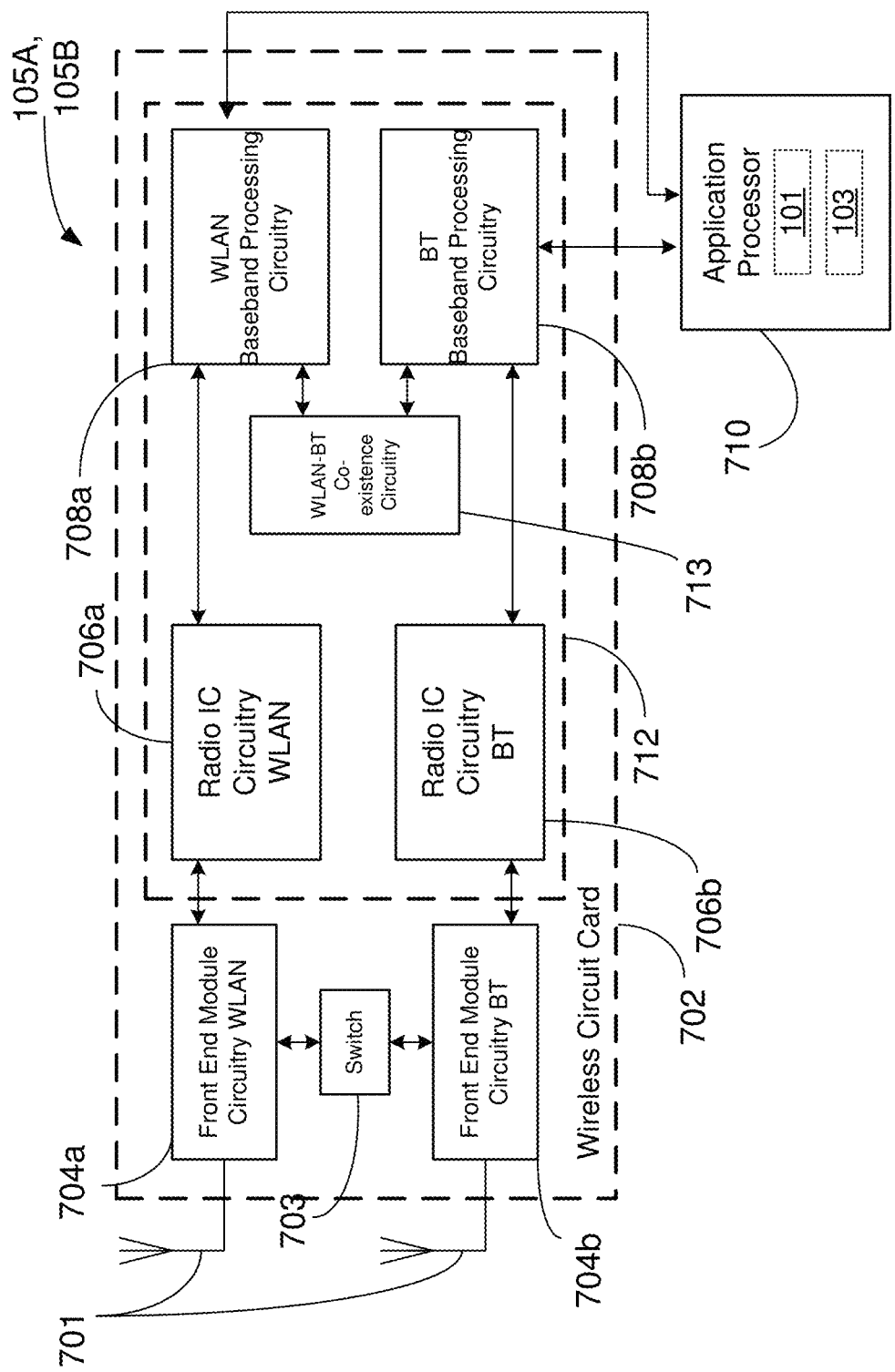
FIG. 7 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3rd Generation Partnership Project (3GPP) standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., directional multi-gigabit (DMG) antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate multi-link re-setup 142 with one or more user devices 120.

It is understood that the above descriptions are for purposes of illustration and are not meant to be limiting.

Figure 2:
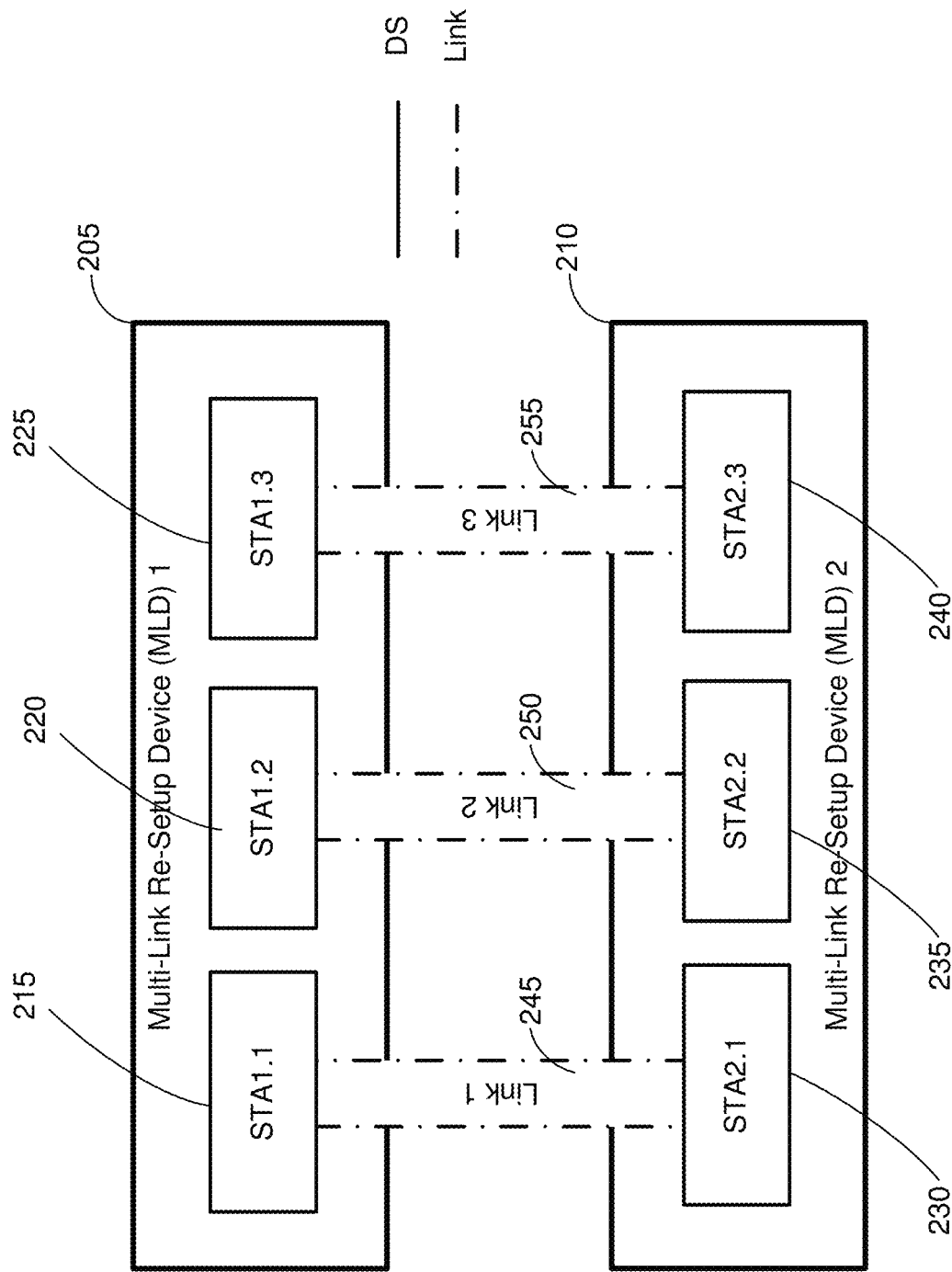
FIGS. 2-4 depict illustrative schematic diagrams for multi-link re-setup, in accordance with one or more example embodiments of the present disclosure.
Figure 3:
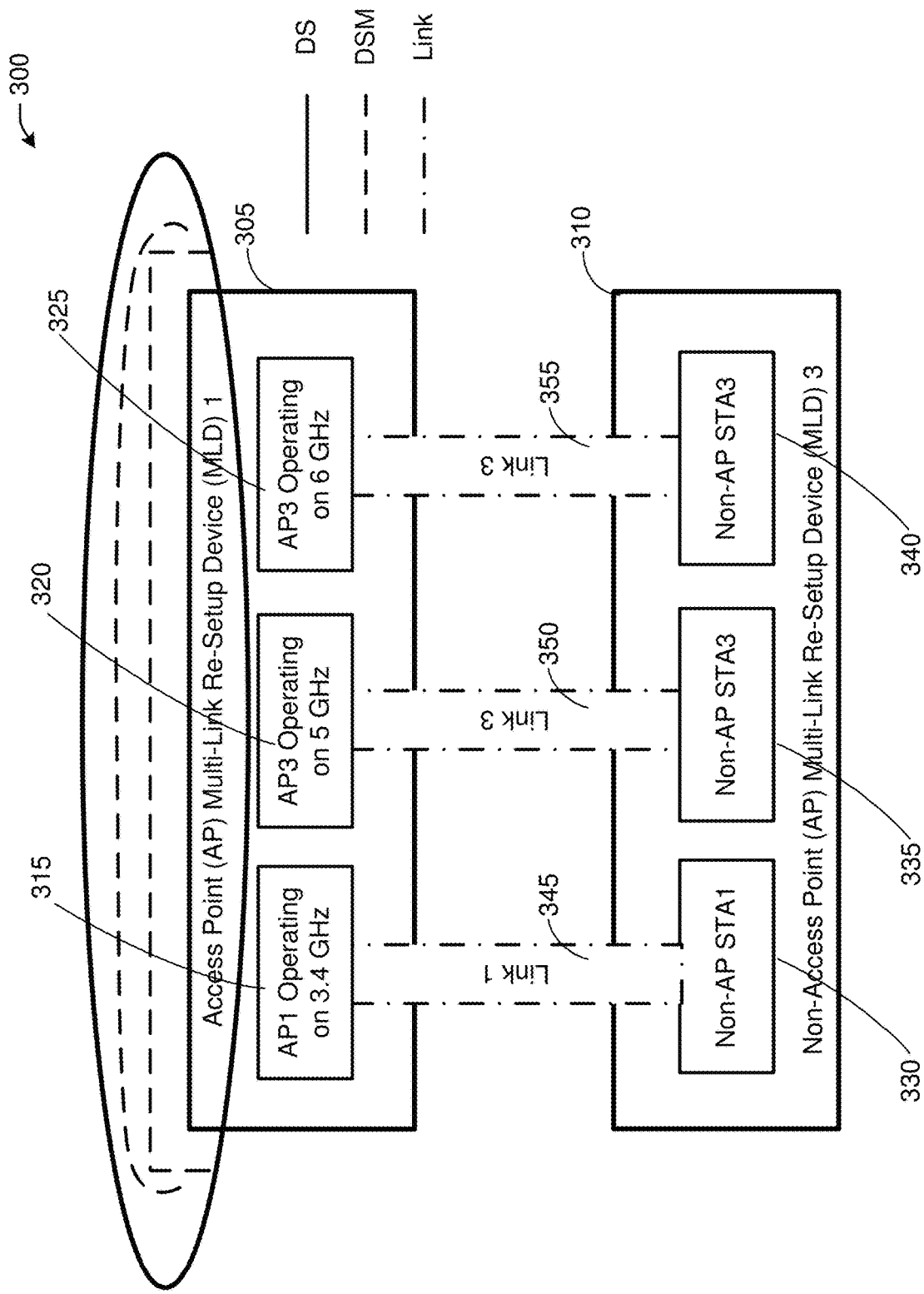

FIGS. 2-3 depict illustrative schematic diagrams for multi-link re-setup, in accordance with one or more example embodiments of the present disclosure.

There are two multi-link logical entities on either side which includes multiple STAs that can setup link with each other. The detailed definition is shown below.

Multi-Link Logical Entity: A logical entity that contains one or more STAs. The logical entity has one MAC data service interface and primitives to the LLC and a single address associated with the interface, which can be used to communicate on the DSM.

In some aspects, a multi-link logical entity allows STAs within the multi-link logical entity to have the same MAC address. It should be appreciated that, although the name MLD 1 is used, as well as descriptors such as an AP MLD and non-AP MLD, this nomenclature is used here for explanatory purposes and should not be considered exhaustive or limiting. The exact names and number of logical entities can be changed.

With respect to an example infrastructure framework, embodiments may include a multi-link AP logical entity, which may include APs on one side of one or more wireless links. The infrastructure framework further includes non-APs on an opposite side of the multi-link AP logical entity. The detailed definition is shown below.

Access Point (AP) Multi-Link Re-Setup Device (MLD): A multi-link logical entity, where each STA within the multi-link logical entity is an EHT AP. It should be noted that the term multi-link logical entity (MLLE) and MLD are interchangeable and indicate the same type of entity. Throughout this disclosure, MLLE may be used, but anywhere the MLLE term is used, it can be replaced with MLD.

Non-AP Multi-Link Re-Setup Device (non-AP MLD): A multi-link logical entity, where each STA within the multi-link logical entity is a non-AP EHT STA. it should be noted that this framework is a natural extension from the one link operation between two STAs (as described with respect to FIG. 2), which are AP and non-AP STA under the infrastructure framework (e.g., when an AP is used as a medium for communication between STAs).

FIG. 2 depicts an illustrative schematic diagram for MLD wireless communication between two logical entities, in accordance with one or more example embodiments of the present disclosure.

Referring to FIG. 2, there are shown two MLDs that include a MLD 1 205 and a MLD 2 210. The MLD1 205 is shown across from the MLD 210, where the MLD 205 connects wirelessly with the MLD2 210 through a plurality of wireless DS links 245, 250, and 255. The MLD1 205 is depicted in FIG. 2 to include multiple STAs such as a STA1.1 215, a STA1.2 220, and a STA1.3 225, that can set up links with each other. The MLDs 1 and 2 (205 and 210, respectively) may be logical entities that respectively contain one or more STAs. A logical entity has one MAC data service interface and primitives to the logical link control (LLC), and a single address associated with the interface, which can be used to communicate on the distribution system medium (DSM). It should be noted that a Multi-link logical entity allows STAs within the multi-link logical entity to have the same MAC address. It should also be noted that the exact name can be changed. Although three STAs are shown as part of the MLD1 205 and MLD2 210, respectively, it should be appreciated that as few as one STA, and/or many more than three STAs may be included as logical entities associated with the MLD1 205 and/or MLD2 210.

In the example of FIG. 2, the MLD1 205 and MLD2 210 are two separate physical devices, where each one comprises any number of virtual or logical devices. For example, the MLD1 205 may include one, two, three, or more STAs, including for example, a STA1.1 215, a STA1.2 220, and a STA1.3 225. The MLD 210 may include three STAs, including a STA2.1 230, a STA2.2 235, and a STA2.3 240. The example shows that the logical device STA1.1 215 is communicating with the logical device STA2.1 230 over the link 1 245, that logical device STA1.2 220 is communicating with the logical device STA2.2 235 over the link 2 250, and the device STA1.3 225 is communicating with the logical device STA2.3 240 over the link 3 255. Although three STAs are shown as part of the MLDs 1 and 2, respectively, it should be appreciated that as few as one STA, and/or many more than three STAs may be included as logical entities associated with the MLD 205 and/or MLD 210.

Embodiments of the present disclosure further include a mechanism to change the entry point mapping through DSM to another AP MLD's MAC data service interface (similar to the functionality of reassociation to a different AP different from the current associated AP). As explained above, disassociation may remove an existing link, and may also remove the AP. This may include renegotiating the link associations by removing some or all of the set up links. The AP MLD may further remove one basic service set (BSS) by sending group addressed disassociation. For example, changing the entry point mapping through DSM may change the entry point mapping through DSM from the MAC data service interface of the AP MLD1 205 to the MAC data service interface of AP MLD2 210.

FIG. 3 depicts an illustrative schematic diagram for a multi-link re-setup mechanism 300 comprising access point (AP) multi-link devices (MLDs) communicating wirelessly with non-AP MLDs, in accordance with one or more example embodiments of the present disclosure. Referring to FIG. 3, there are shown two MLDs including an AP MLD1 305 and a non-AP MLD2 310 depicted on either side of a plurality of links 345, 350, and 355, respectively. The MLD1 305 and the MLD3 310 may include multiple STAs configured for setting up links with each other. For infrastructure framework, the AP MLD 305 may include a plurality of APs (e.g., AP1 315, AP2 320, and AP3 325) on one side. On the other side of the wireless links 345, 350 and 355, respectively, a non-AP MLD3 310 may also include a plurality of non-AP STAs (e.g., a non-AP STA1 330, a non-AP STA2 335, and a non-AP STA3 340).

According to an embodiment of the present disclosure, the multi-link re-setup mechanism 300 includes a different AP MLD that the non-AP MLD3 310 changes the entry point mapping through DSM from the MAC data service interface (not shown in FIG. 3) of the AP MLD1 305 to the MAC data service interface of the AP MLD 2 310.

The AP MLD1 305 and the non-AP MLD3 310 are two separate physical devices, where each one comprises a number of virtual or logical devices. For example, the MLD1 305 may include three physical devices, represented in FIG. 3 as APs, such as, for example, the AP1 315 operating on 2.4 GHz, the AP2 320 operating on 5 GHz, and the AP3 325 operating on 6 GHz. Further, the multi-link non-AP MLD3 310 may include three non-AP STAs, including the non-AP STA1 330 communicating with the AP1 315 on the link 1 345, the non-STA2 335 communicating with the AP2 on the link 2 350, and the non-AP STA3 340 communicating with the AP3 325 on link 3. It should be understood that although the example shows three logical entities within the AP MLD1 305 and the three logical entities within the non-AP MLD 3 310, this is merely for illustration purposes and that other numbers of logical entities with each of the multi-link AP and non-AP logical entities may be envisioned.

The MLD1 305 is shown in FIG. 3 to have access to a distribution system (DS), depicted in FIG. 3 as a two-dot dashed line. The DS may be a system used to interconnect a set of BSSs to create an extended service set (ESS). The MLD1 305 is also shown in FIG. 3 to have access a distribution system medium (DSM), which is the medium used by a DS for BSS interconnections. Simply put, DS and DSM allow the AP to communicate with different BSSs. According to one aspect of the present disclosure, a MLD (either the MLD1 305 and/or the MLD 3 310) may remove the entry point mapping (not shown in FIG. 3) through DSM under multi-link (similar to the functionality of disassociation).

Figure 4:
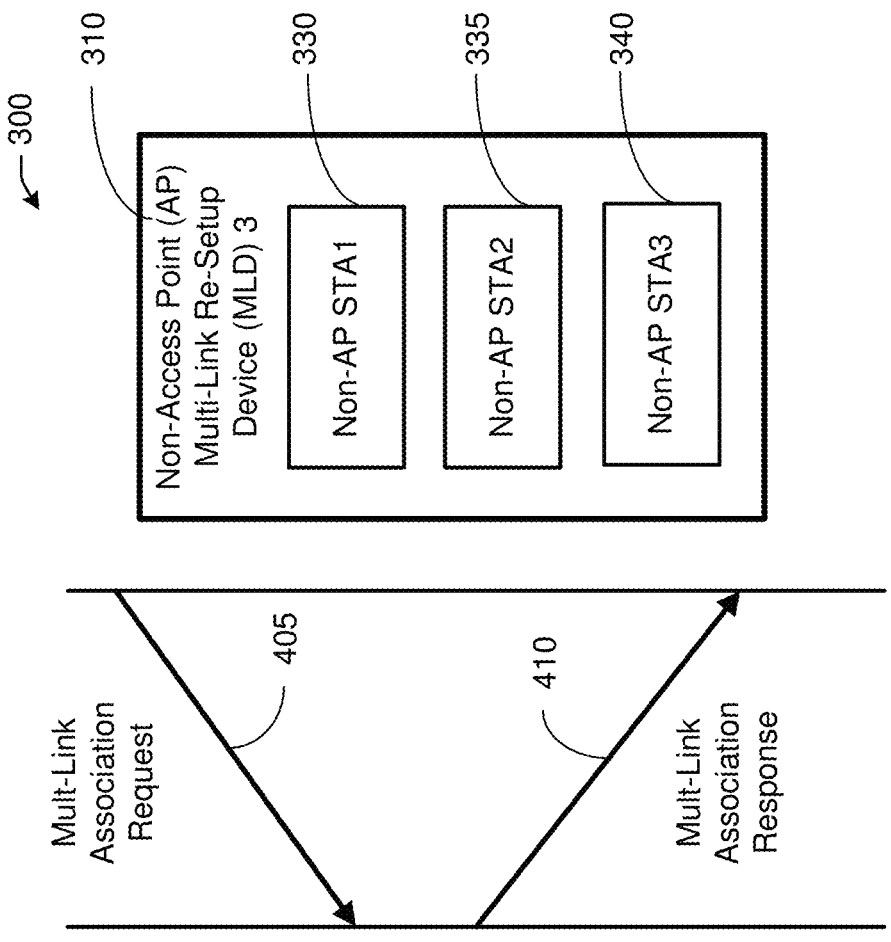
Figure 4:
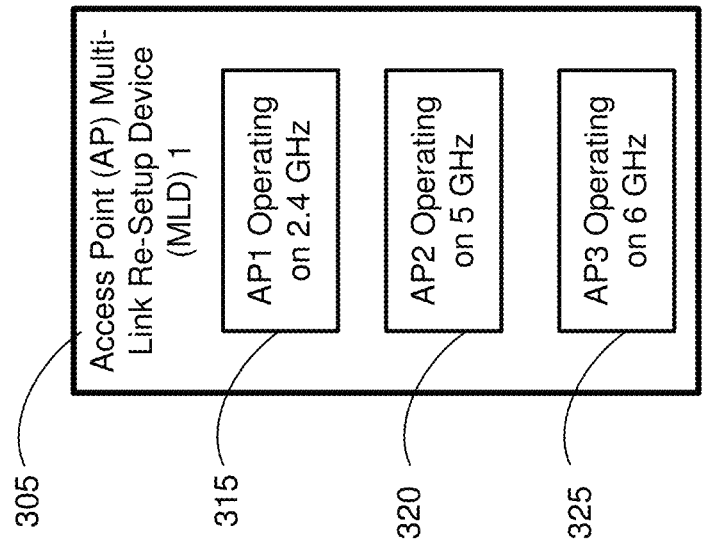

FIG. 4 depicts a multi-link re-setup process including a two-way handshake, in accordance with one or more embodiments. In some scenarios, the links 345, 350, and 355 (as depicted in FIG. 3) can be setup by a two-way handshake called multi-link association request/response among the two MLDs 305 and 310.

The multi-link re-setup mechanism 300 may be further configured to change an entry point mapping by requiring the two-way handshake between the non-AP MLD3 310 and the AP MLD1 305. The two-way handshake may include an association request frame 405 from the non-AP MLD3 310 and a response frame 410 from the AP MLD1 305.

The multi-link setup between the AP-MLD1 305 and the non-AP MLD3 310 maps the MAC data service interface of the AP MLD 304 as the entry point for routing to the non-AP MLD3 310 through DSM, and exchanges capability of the links that are being setup. In an example embodiment, if a re-setup operation is successful (e.g., an operative connection or link is formed), then all of the multi-link setup parameters (setup parameters not shown in FIG. 3) between the AP MLD1 305 and the non-AP MLD3 310 are deleted. The request frame from the non-AP MLD3 310 may include an indication for a MLD MAC address of the non-AP MLD3 310, and may be transmitted to any AP 315, 320, 325, etc. of the AP MLD1 305 (shown in FIG. 3).

The association request/response frame 405, 410 indicates that the frame is for multi-link setup rather than traditional association between one AP and one STA. An element for multi-link can be used for the purpose. The association request frame 405 indicates the AP MLD is targeted for re-setup. Again, the indication can be in the element, and may be made by the receiving station address (RA) of the association frame, where the MAC addresses is one of the STAs 330, 335, and/or 340 of the target AP MLD1 305 or another target MLD (not shown in FIG. 4). This scenario assumes that different MLD does will not include an AP with the same MAC address.

The reassociation response frame from the AP MLD1 305 may include the indication for the MLD MAC address of the AP MLD1 305, and may be transmitted to any non-AP STA 330, 335, 340, etc. of the non-AP MLD3 310. The indication can be in the element. In one aspect, the indication can be by the RA of the reassociation frame, where the MAC address is one of the STAs 330, 335, 340, etc., of the target non-AP MLD 310. In one example implementation, the data negotiation may be deleted after re-setup is successful. In another aspect, the security negotiation may be deleted after the re-setup is successful. In another example embodiment, the existing security negotiation is not deleted after the re-setup is successful, and is kept after the re-setup in the device memory.

Removing the entry point mapping may include disassociation that removes the AP, and removes all of the links set up. For example, if the mapping associates the link 345 to the AP1 315 connecting with the non-AP STA 1 330, the link 350 connecting the AP2 320 with the non-AP STA 2 335, and the link 355 connecting the AP3 325 with the non-AP STA3 340, disassociation may remove all of the links 345, 350, and 355.

In another aspect, a disassociation by the MLD 3 310 may remove one or more of the links 345, 350, and 355, but keep the existing AP 315. As another example, the non-AP device (e.g., the non-AP STA 2 335) may want to preserve the AP 320, but change the parameters.

In another aspect, the non-AP MLD3 310 may reassociate from one AP MLD (e.g., the MLD1 305) to another AP MLD (not shown in FIG. 3). In one example embodiment, the processing circuitry causes the single request frame response frame exchange to reestablish multiple links between the AP MLD1 305 and the non-AP MLD3 310.

In yet another aspect, the non-AP MLD3 310 may also change the parameters by changing from a single link (e.g., 345) to two links (e.g., 345 and 355), or three links (e.g., 345, 350, and 355 as shown in FIG. 3), etc. Other combinations of setup and/or re-setup are possible, and such scenarios are contemplated.

In another aspect, the MLD3 310 may send the one-way notification via the AP MLD1 305 with one of a broadcast address or a group address.

Embodiments of the present disclosure further include the multi-link re-setup mechanism 300 mechanism changing the entry point mapping (not shown in FIG. 3) through DSM to another AP MLD's MAC data service interface (similar to the functionality of reassociation to a different AP different from the current associated AP). As explained above, disassociation may remove an existing link, and may also remove the AP. This may include renegotiating the link associations by removing some or all of the set up links.

For multi-link re-setup, renegotiating the link may include creating a new frame beyond reassocation/association request/response. This option, in some implementations, may experience increased functionality if multi-link setup does not reuse existing association request/response. The new request/response frame can be the new frame used for multi-link setup and an indication may be provided to differentiate setup and re-setup.

In another aspect, the new request/response frame can be different from the new frame used for multi-link setup.

In yet another example implementation, the new request/response frame may indicate the AP MLD1 305 that is targeted for re-setup.

The indication can be by the RA of the reassociation frame, where the MAC addresses is one of the STAs of the target AP MLD, which can be the AP MLD 1 305 or another AP MLD (not shown). This assumes that different MLD will not include AP with the same MAC address.

The new request/response frame may indicate that the non-AP MLD3 310 is targeted for re-setup, and the indication can be in the element. The indication can be by the RA of the reassociation frame, where the MAC addresses is one of the STA of the target non-AP MLD.

The AP MLD1 305 may further remove one basic service set (BSS) by sending group addressed disassociation. For example, changing the entry point mapping through DSM may change the entry point mapping (not shown in FIG. 3) through DSM from the MAC data service interface (the interface not shown in FIG. 3) of the AP MLD1 305 to the MAC data service interface of AP MLD3 310 (the interface not shown in FIG. 3). The disassociation frame may include a MLD MAC address from which the disassociation frame originates, and an indication from the non-AP MLD that the existing entry point mapping is kept as one bit. The separately indicated links may consist of either the transmitted disassociation links or additional signaling for further links.

Another embodiment of the present disclosure includes a mechanism that maintains the entry point mapping through DSM, and deletes all the data transmission negotiation, security negotiation, and reset parameters. For example, the multi-link re-setup mechanism 300 may keep the entry point mapping to the non-AP MLD3 310 to the DSM as the AP MLD.

In another embodiment of the present disclosure, the multi-link re-setup mechanism 300 may remove one or more links 345, 350, and/or 355 under the same entry point mapping through DSM. For example, the non-AP MLD3 310 may remove a single link (e.g., the link 345), remove two links (e.g., the links 345 and 355), or remove all three links (e.g., the links 345, 350, and 355). Other combinations of link removal are possible.

The multi-link re-setup mechanism 300 may delete multi-link setup parameters (not shown in FIG. 3) including negotiated link information, negotiated data transmission parameters, and negotiated security parameters between the AP MLD1 305 and the non-AP MLD3 310 before reestablishing multiple links between the AP MLD1 305 and the non-AP MLD3 310. In another aspect, the AP MLD1 305 is further configured to delete all security transmission negotiation data responsive to an operative entry point mapping re-setup. An operative entry point mapping re-setup is a re-setup operation where the re-setup is successfully made, and the mappings are functional. Establishing the multi-link re-setup may include resetting a plurality of parameters to an initial state. Example parameters can include enhanced distributed channel access (EDCA), sequence numbers, and/or other related parameters. This step may further include resetting a plurality of parameters to an initial state.

In yet another embodiment of the present disclosure, a mechanism adds one or more links under the same entry point mapping through the DSM. For example, the AP MLD restarts one BSS.

Compared with a single link setup, after association request/response exchange between an AP and a non-AP STA, there is a mapping for the MAC data service interface of AP as the entry point for routing to non-AP through DSM. For example, the processing circuitry of the non-AP MLD3 310 may cause the single request frame response frame exchange to reestablish multiple links between the AP MLD1 305 and the non-AP MLD3 310.

Figure 5:
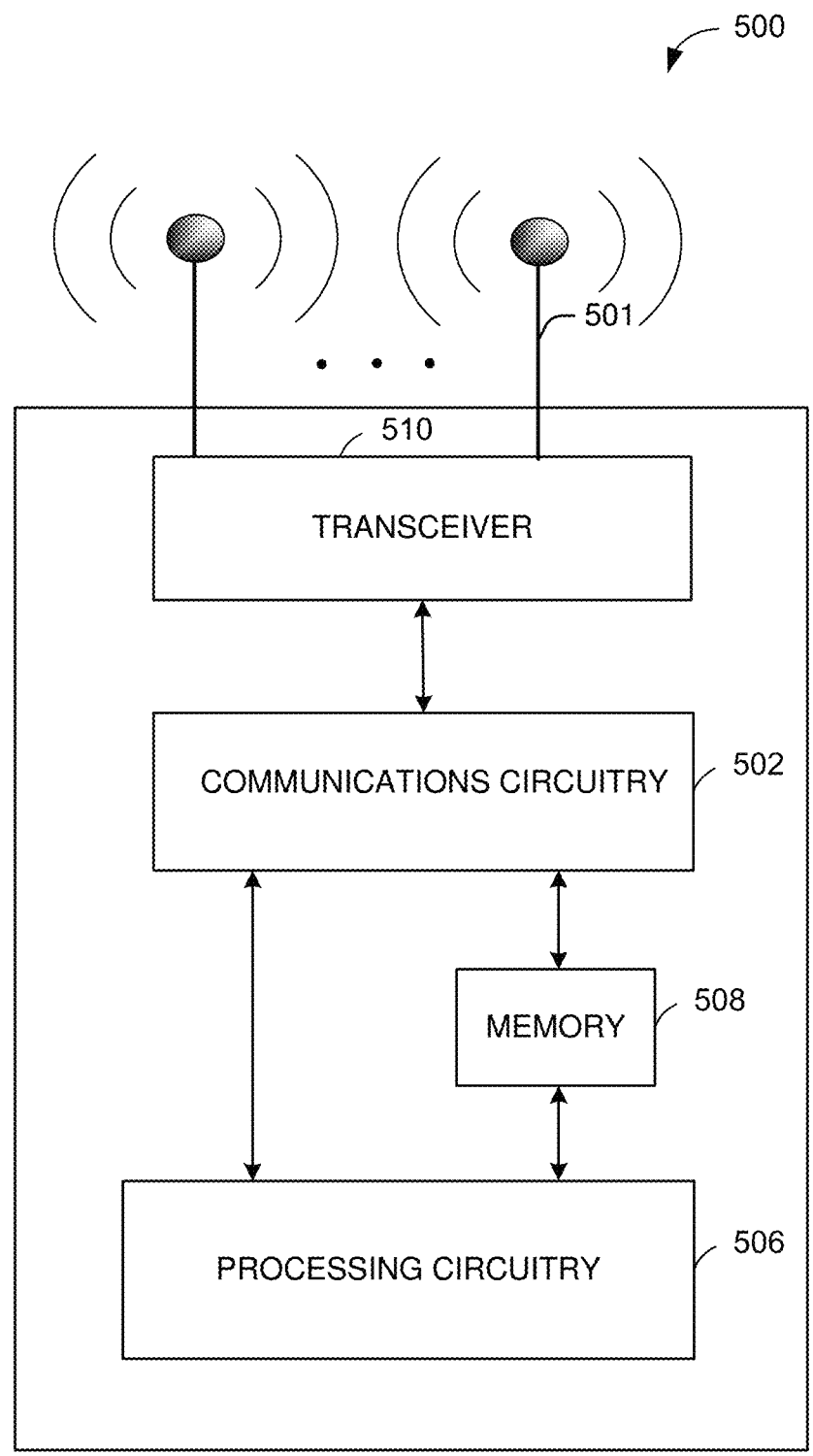
FIG. 5 illustrates a flow diagram of illustrative process for an illustrative multi-link re-setup system, in accordance with one or more example embodiments of the present disclosure.

FIG. 5 shows a functional diagram of an exemplary communication station 500, in accordance with one or more example embodiments of the present disclosure. In one embodiment, FIG. 5 illustrates a functional block diagram of a communication station that may be suitable for use as an AP 102 (FIG. 1) or a user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a multi-link re-setup device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the multi-link re-setup device 6110. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The multi-link re-setup device 619 may carry out or perform any of the operations and processes described and shown above.

It is understood that the above are only a subset of what the multi-link re-setup device 6110 may be configured to perform and that other functions included throughout this disclosure may also be performed by the multi-link re-setup device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium.

Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

FIG. 7 is a block diagram of a radio architecture 105A, 105B in accordance with some embodiments that may be implemented in any one of the example AP 102 and/or the example STAs 230, 235, 240, 330, 335, 340 of FIGS. 2-4. Radio architecture 105A, 105B may include radio front-end module (FEM) circuitry 704a-b, radio IC circuitry 706a-b and baseband processing circuitry 708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a device for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704a-b, the radio IC circuitry 706a-b, and baseband processing circuitry 708a-b may be provided on a single radio card, such as wireless radio card 702. In some other embodiments, the one or more antennas 701, the FEM circuitry 704a-b and the radio IC circuitry 706a-b may be provided on a single radio card. In some other embodiments, the radio IC circuitry 706a-b and the baseband processing circuitry 708a-b may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-20010, IEEE 802.11-2012, IEEE 802.11-2016, 802.11n-20010, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 1000 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 1020 MHz channel bandwidth may be used. The scope of the embodiments is not limited with respect to the above center frequencies however.

Figure 8:
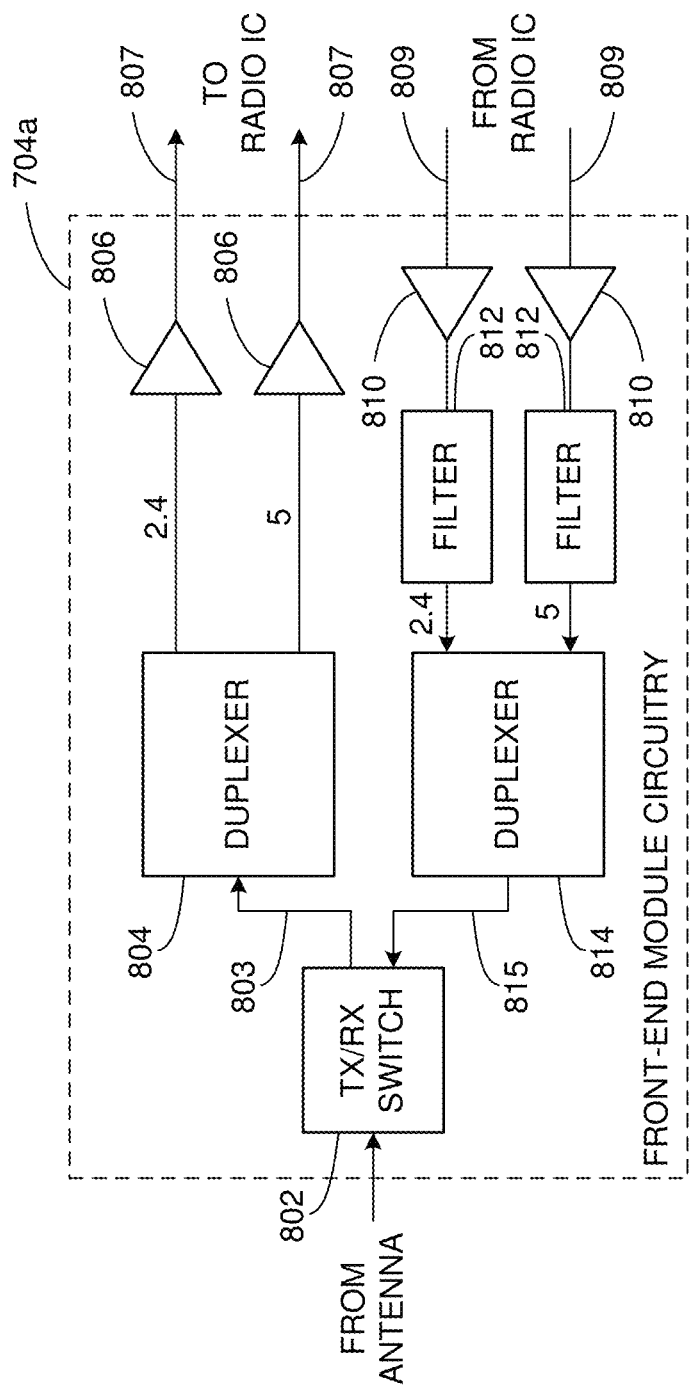
FIG. 8 is a block diagram of a radio architecture in accordance with some examples.

FIG. 8 illustrates WLAN FEM circuitry 704a in accordance with some embodiments. Although the example of FIG. 8 is described in conjunction with the WLAN FEM circuitry 704a, the example of FIG. 8 may be described in conjunction with the example BT FEM circuitry 704b (FIG. 7), although other circuitry configurations may also be suitable.

In some embodiments, the FEM circuitry 704a may include a TX/RX switch 802 to switch between transmit mode and receive mode operation. The FEM circuitry 704a may include a receive signal path and a transmit signal path. The receive signal path of the FEM circuitry 704a may include a low-noise amplifier (LNA) 806 to amplify received RF signals 803 and provide the amplified received RF signals 807 as an output (e.g., to the radio IC circuitry 706a-b (FIG. 7)). The transmit signal path of the circuitry 704a may include a power amplifier (PA) to amplify input RF signals 8010 (e.g., provided by the radio IC circuitry 706a-b), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704a may be configured to operate in either the 2.4 GHz frequency spectrum or the 5 GHz frequency spectrum. In these embodiments, the receive signal path of the FEM circuitry 704a may include a receive signal path duplexer 804 to separate the signals from each spectrum as well as provide a separate LNA 806 for each spectrum as shown. In these embodiments, the transmit signal path of the FEM circuitry 704a may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704a as the one used for WLAN communications.

Figure 9:
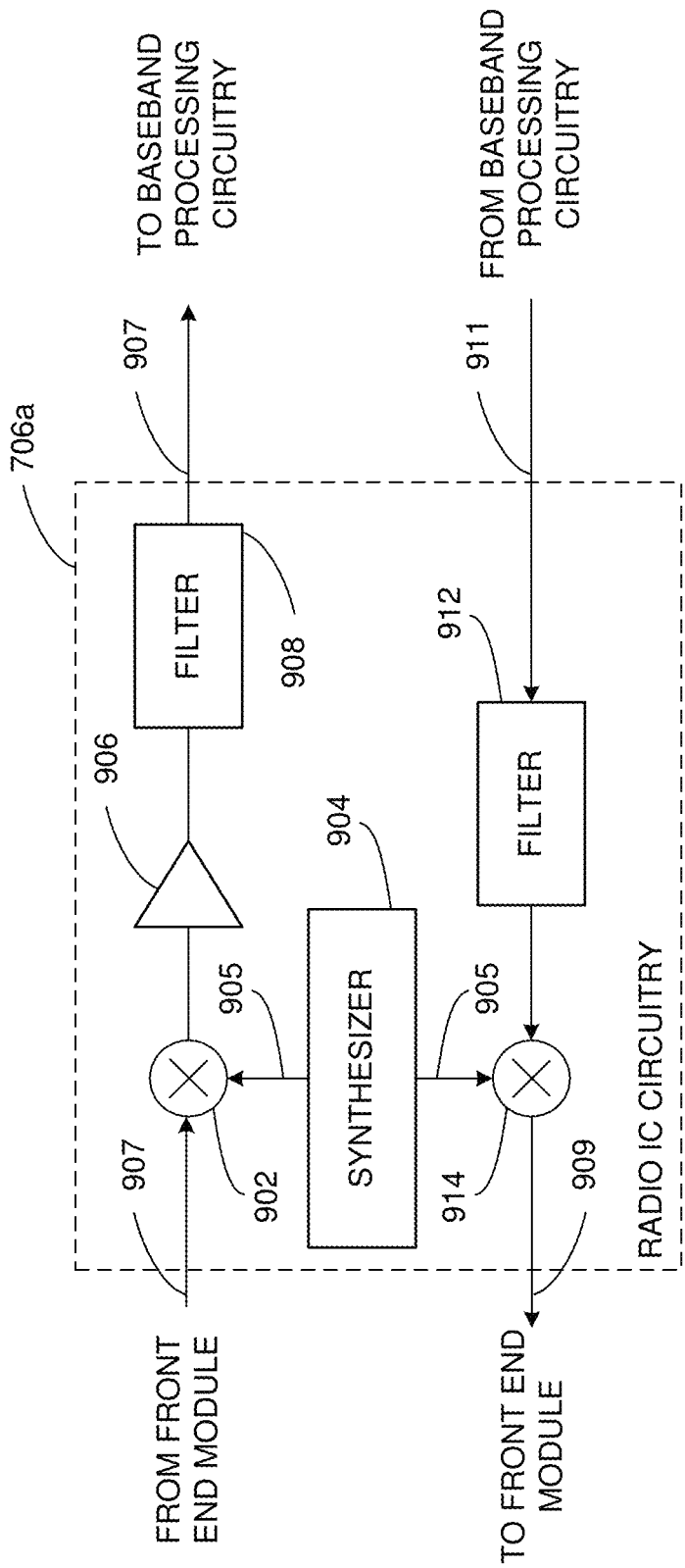
FIG. 9 illustrates an example front-end module circuitry for use in the radio architecture of FIG. 7, in accordance with one or more example embodiments of the present disclosure.

FIG. 9 illustrates radio IC circuitry 706a in accordance with some embodiments. The radio IC circuitry 706a is one example of circuitry that may be suitable for use as the WLAN or BT radio IC circuitry 706a/706b (FIG. 7), although other circuitry configurations may also be suitable. Alternatively, the example of FIG. 9 may be described in conjunction with the example BT radio IC circuitry 706b.

In some embodiments, the radio IC circuitry 706a may include a receive signal path and a transmit signal path. The receive signal path of the radio IC circuitry 706a may include at least mixer circuitry 902, such as, for example, down-conversion mixer circuitry, amplifier circuitry 906 and filter circuitry 908. The transmit signal path of the radio IC circuitry 706a may include at least filter circuitry 912 and mixer circuitry 914, such as, for example, up-conversion mixer circuitry. Radio IC circuitry 706a may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 907 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 910 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 907 from FIG. 9 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 907 (FIG. 9) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
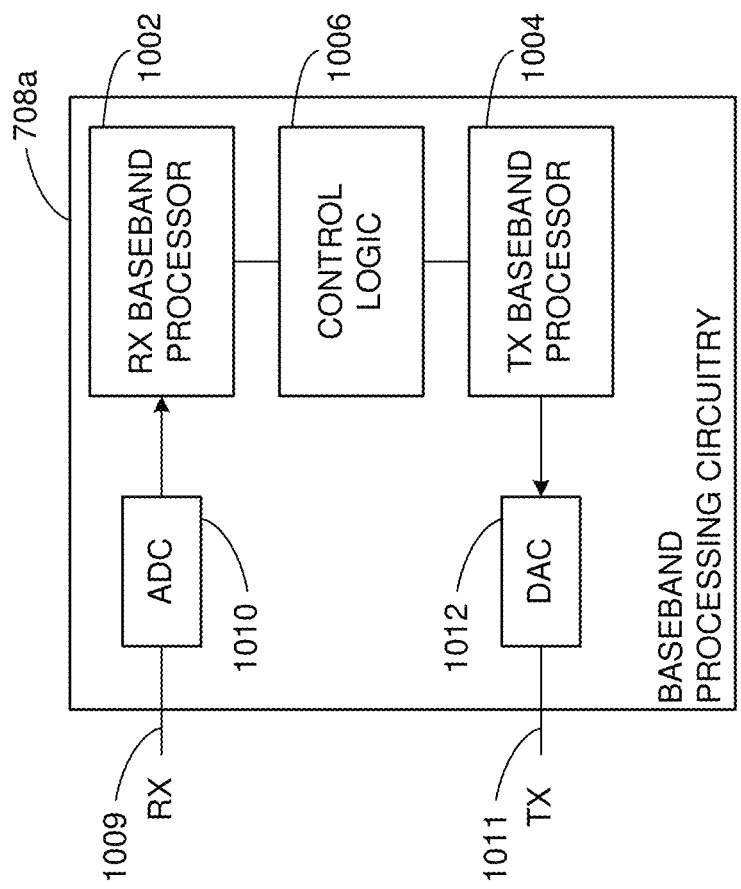
FIG. 10 illustrates a functional block diagram of baseband processing circuitry 708a in accordance with some embodiments.

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 9 may be used to implement the example BT baseband processing circuitry 708b of FIG. 7.

The baseband processing circuitry 708a may include a receive baseband processor (RX BBP) 1002 for processing receive baseband signals 9010 provided by the radio IC circuitry 706a-b (FIG. 7) and a transmit baseband processor (TX BBP) 1004 for generating transmit baseband signals 911 for the radio IC circuitry 706a-b. The baseband processing circuitry 708a may also include control logic 1006 for coordinating the operations of the baseband processing circuitry 708a.

Figure 11:
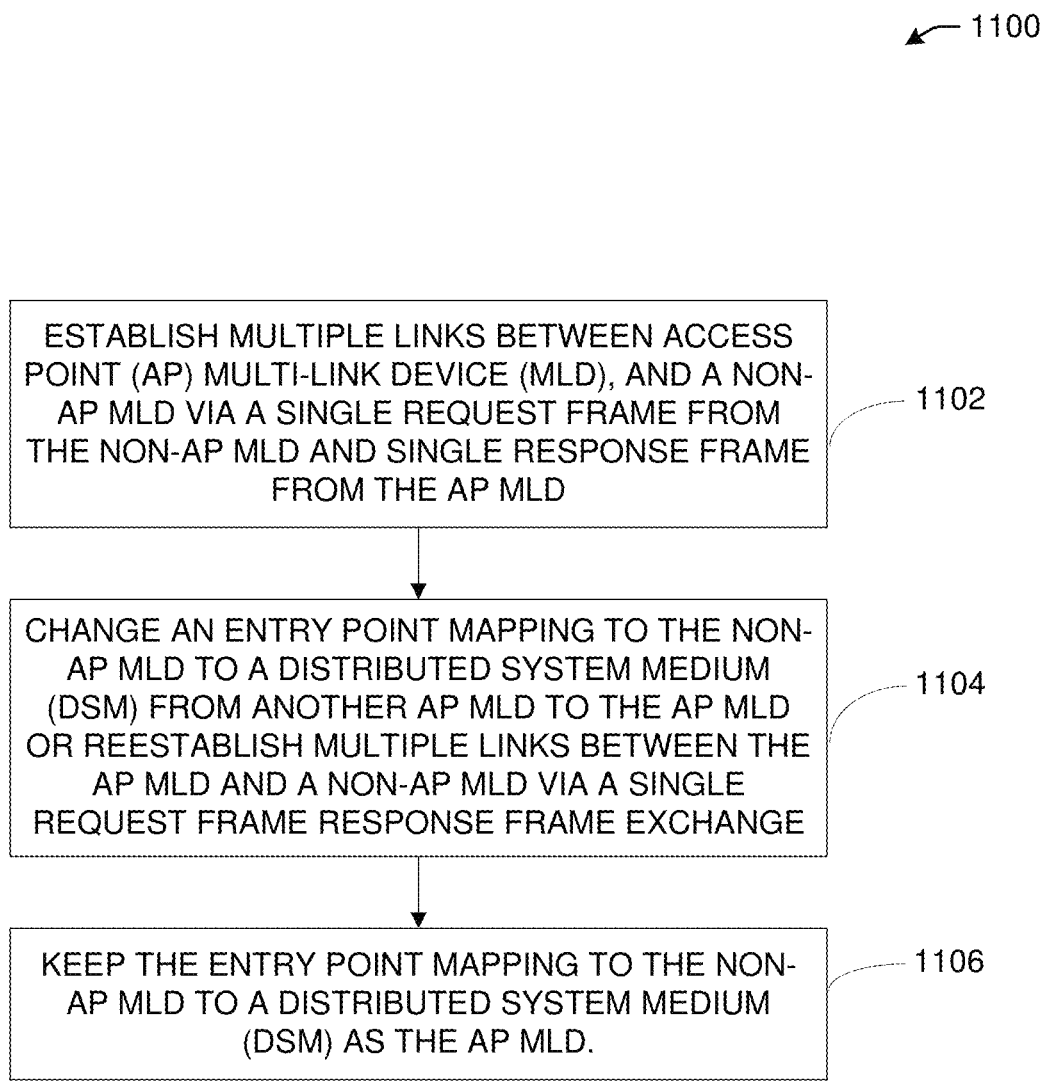
FIG. 11 illustrates a flow diagram of a process for multi-link re-setup and link change in accordance with one or more example embodiments of the present disclosure.

FIG. 11 illustrates a flow diagram of a process 1100 for multi-link re-setup and link change in accordance with one or more example embodiments of the present disclosure.

At block 1102, a device (e.g., the user device(s) 120 and/or the AP 102 of FIG. 1) may establish, by one or more processors, multiple links between access point (AP) multi-link device (MLD), and a non-AP MLD via a single request frame from the non-AP MLD and single response frame from the AP MLD.

At block 1104, the device may change an entry point mapping to the non-AP MLD to a distributed system medium (DSM) from another AP MLD to the AP MLD or reestablish multiple links between the AP MLD and a non-AP MLD via a single request frame response frame exchange.

At block 1106, the device may keep an entry point mapping to the non-AP MLD to a distributed system medium (DSM) as the AP MLD. The device removes one or more links and comprises the processing circuitry being further configured to sending a one-way notification from one of the AP MLD or the non-AP MLD. The device sends the one-way notification using a disassociation frame and an indication to non-AP MLD that an entry point mapping in the storage is kept, and only separately indicated links are removed between the AP MLD and non-AP MLD.

It is understood that the above descriptions are for purposes of illustration and are not meant to be limiting.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an access point (AP) multi-link device (MLD). The access point also includes establish multiple links between the AP MLD and a non-AP MLD via a single request frame from the non-AP MLD and single response frame from the AP MLD. The access point also includes change an entry point mapping to the non-AP MLD to a distributed system medium (DSM) from another AP MLD to the AP MLD or reestablish multiple links between the AP MLD and a non-AP MLD via a single request frame response frame exchange. The access point also includes keep the entry point mapping to the non-AP MLD to a distributed system medium (DSM) as the AP MLD. Other embodiments of this aspect include corresponding computer systems, apparatus, and computer programs recorded on one or more computer storage devices, each configured to perform the actions of the methods.

Implementations may include one or more of the following features. The AP MLD where the AP MLD includes one or more aps, and changes an entry point mapping through DSM from a mac data service interface of the AP MLD. The AP MLD is further configured to delete multi-link setup parameters including negotiated link information, negotiated data transmission parameters and negotiated security parameters between the AP MLD and the non-AP MLD before reestablishing multiple links between the AP MLD and a non-AP MLD. The AP MLD is further configured to delete all security transmission negotiation data responsive to an operative entry point mapping re-setup. Establishing the multiple links includes resetting a plurality of parameters to an initial state. The single request frame from the non-AP MLD is a reassociation request frame; and the single response frame from the AP MLD is a reassociation response frame. The single request frame from the non-AP MLD includes an indication for a mld mac address of the non-AP MLD and is transmitted to any ap of the AP MLD, and the reassociation response frame from the AP MLD includes the indication for the MLD mac address of the AP MLD and is transmitted to any non-AP STA of the non-AP MLD. Implementations of the described techniques may include hardware, a method or process, or computer software on a computer-accessible medium.

One general aspect includes an access point (AP) multi-link device (MLD). The access point also includes establish multiple links between the AP MLD and a non-AP MLD via a request frame from the non-AP MLD and a response frame from the AP MLD. The access point also includes add or remove one or more links between the AP MLD and a non-AP MLD without deleting multi-link setup parameters for other links. The access point also includes keep an entry point mapping to the non-AP MLD to a distributed system medium (DSM) as the AP MLD. Other embodiments of this aspect include corresponding computer systems, apparatus, and computer programs recorded on one or more computer storage devices, each configured to perform the actions of the methods.

Implementations may include one or more of the following features. The AP MLD where the processing circuitry is further configured to: remove one or more links includes the processing circuitry being further configured to sending a one-way notification from one of the AP MLD or the non-AP MLD. The processing circuitry is further configured to: send the one-way notification via the AP MLD with one of a broadcast address or a group address. The processing circuitry is further configured to: send the one-way notification using a disassociation frame and an indication to non-AP MLD that an entry point mapping in the storage is kept, and only separately indicated links are removed between the AP MLD and non-AP MLD. The disassociation frame includes: a MLD mac address from which the disassociation frame originates; and an indication from the non- AP MLD that the entry point mapping is kept as one bit, where the separately indicated links include of one of transmitted disassociation links or additional signaling for further links. The processing circuitry is further configured to: add one or more links between the AP MLD and a non-AP MLD; and send a two-way notification starting from the non-AP MLD or the AP MLD, the two-way notification including individual addresses with acknowledgement. Implementations of the described techniques may include hardware, a method or process, or computer software on a computer-accessible medium.

One general aspect includes a method for access point (AP) multi-link device (MLD) re-setup. The method also includes establishing, by one or more processors, multiple links between access point (AP) multi-link device (MLD), and a non-AP MLD via a single request frame from the non-AP MLD and single response frame from the AP MLD. The method also includes changing an entry point mapping to the non-AP MLD to a distributed system medium (DSM) from another AP MLD to the AP MLD or reestablish multiple links between the AP MLD and a non-AP MLD via a single request frame response frame exchange. The method also includes keeping the entry point mapping to the non-AP MLD to a distributed system medium (DSM) as the AP MLD. Other embodiments of this aspect include corresponding computer systems, apparatus, and computer programs recorded on one or more computer storage devices, each configured to perform the actions of the methods.

One general aspect includes a method for access point (AP) multi-link device (MLD) re-setup. The method also includes establishing multiple links between access point (AP) multi-link device (MLD), and a non-AP MLD via a single request frame from the non-AP MLD and single response frame from the AP MLD. The method also includes changing an entry point mapping to the non-AP MLD to a distributed system medium (DSM) from another AP MLD to the AP MLD or reestablish multiple links between the AP MLD and a non-AP MLD via a single request frame response frame exchange. The method also includes keeping the entry point mapping to the non-AP MLD to a distributed system medium (DSM) as the AP MLD. Other embodiments of this aspect include corresponding computer systems, apparatus, and computer programs recorded on one or more computer storage devices, each configured to perform the actions of the methods.

Implementations may include one or more of the following features. The method where the AP MLD includes one or more aps, and is further configured for: changing an entry point mapping through DSM from a mac data service interface of the AP MLD. The AP MLD is further configured for: deleting multi-link setup parameters including negotiated link information, negotiated data transmission parameters and negotiated security parameters between the AP MLD and the non-AP MLD before reestablishing multiple links between the AP MLD and a non-AP MLD. The AP MLD is further configured for: deleting all security transmission negotiation data responsive to an operative entry point mapping re-setup. Establishing the multiple links includes resetting a plurality of parameters to an initial state. The request frame from the non-AP MLD is a reassociation request frame; and the single response frame from the AP MLD is a reassociation response frame. Implementations of the described techniques may include hardware, a method or process, or computer software on a computer-accessible medium.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An access point (AP) multi-link device (MLD), the AP MLD comprising processing circuitry coupled to storage, the processing circuitry configured to:
   establish multiple links between the AP MLD and a non-AP MLD via a single request frame from the non-AP MLD and single response frame from the AP MLD, wherein the AP MLD comprises one or more APs, and changes an entry point mapping through DSM from a medium access control (MAC) data service interface of the AP MLD; and
   change an entry point mapping associated with the non-AP MLD through a distributed system medium (DSM) from another AP MLD to the AP MLD or reestablish multiple links between the AP MLD and the non-AP MLD via a single request frame response frame exchange.

2. The AP MLD of claim 1, wherein the AP MLD is further configured to delete multi-link setup parameters including negotiated link information, negotiated data transmission parameters and negotiated security parameters between the AP MLD and the non-AP MLD before reestablishing multiple links between the AP MLD and the non-AP MLD.

3. The AP MLD of claim 1, wherein the AP MLD is further configured to delete all security transmission negotiation data responsive to an operative entry point mapping re-setup.

4. The AP MLD of claim 1, wherein establishing the multiple links comprises resetting a plurality of parameters to an initial state.

5. The AP MLD of claim 1, wherein the single request frame from the non-AP MLD is a reassociation request frame; and the single response frame from the AP MLD is a reassociation response frame.

6. The AP MLD of claim 5, wherein the single request frame from the non-AP MLD includes an indication for a MLD medium access control (MAC) address of the non-AP MLD and is transmitted to any AP of the AP MLD, and the reassociation response frame from the AP MLD includes the indication for the MLD MAC address of the AP MLD and is transmitted to any non-AP STA of the non-AP MLD.

7. An access point (AP) multi-link device (MLD), the AP MLD comprising processing circuitry coupled to storage, the processing circuitry configured to:
   establish multiple links between the AP MLD and a non-AP MLD via a request frame from the non-AP MLD and a response frame from the AP MLD;
   add or remove one or more links between the AP MLD and a non-AP MLD without deleting multi-link setup parameters for other links; and
   keep an entry point mapping to the non-AP MLD to a distributed system medium (DSM) as the AP MLD.

8. The AP MLD of claim 7, wherein the processing circuitry is further configured to:
   remove one or more links comprises the processing circuitry being further configured to sending a one-way notification from one of the AP MLD or the non-AP MLD.

9. The AP MLD of claim 8, wherein the processing circuitry is further configured to:
   send the one-way notification via the AP MLD with one of a broadcast address or a group address.

10. The AP MLD of claim 9, wherein the processing circuitry is further configured to:
    send the one-way notification using a disassociation frame and an indication to non-AP MLD that an entry point mapping in the storage is kept, and only separately indicated links are removed between the AP MLD and non-AP MLD.

11. The AP MLD of claim 10, wherein the disassociation frame comprises:
    a MLD MAC address from which the disassociation frame originates; and
    an indication from the non-AP MLD that the entry point mapping is kept as one bit, wherein the separately indicated links consist of one of transmitted disassociation links or additional signaling for further links.

12. The AP MLD of claim 7, wherein the processing circuitry is further configured to:
    add one or more links between the AP MLD and a non-AP MLD; and
    send a two-way notification starting from the non-AP MLD or the AP MLD, the two-way notification comprising individual addresses with acknowledgement.

13. A method for access point (AP) multi-link device (MLD) re-setup comprising:
    establishing, by one or more processors, multiple links between access point (AP) multi-link device (MLD), and a non-AP MLD via a single request frame from the non-AP MLD and single response frame from the AP MLD;
    changing an entry point mapping associated with the non-AP MLD through a distributed system medium (DSM) from another AP MLD to the AP MLD or reestablish multiple links between the AP MLD and the non-AP MLD via a single request frame response frame exchange; and deleting multi-link setup parameters including negotiated link information, negotiated data transmission parameters and negotiated security parameters between the AP MLD and the non-AP MLD before reestablishing multiple links between the AP MLD and the non-AP MLD.

14. A method for access point (AP) multi-link device (MLD) re-setup comprising:
   establishing multiple links between access point (AP) multi-link device (MLD), and a non-AP MLD via a single request frame from the non-AP MLD and single response frame from the AP MLD, wherein the AP MLD comprises one or more APs, and changes an entry point mapping through DSM from a medium access control (MAC) data service interface of the AP MLD; and
   changing an entry point mapping associated with the non-AP MLD through a distributed system medium (DSM) from another AP MLD to the AP MLD or reestablish multiple links between the AP MLD and the non-AP MLD via a single request frame response frame exchange.

15. The method of claim 14, wherein the AP MLD is further configured for:
   deleting multi-link setup parameters including negotiated link information, negotiated data transmission parameters and negotiated security parameters between the AP MLD and the non-AP MLD before reestablishing multiple links between the AP MLD and the non-AP MLD.

16. The method of claim 14, wherein the AP MLD is further configured for:
   deleting all security transmission negotiation data responsive to an operative entry point mapping re-setup.

17. The method of claim 14, wherein establishing the multiple links comprises resetting a plurality of parameters to an initial state.

18. The method of claim 14, wherein
   the request frame from the non-AP MLD is a reassociation request frame; and
   the single response frame from the AP MLD is a reassociation response frame.

* * * * *